_
UNITED STATES PATENT OFFICE.

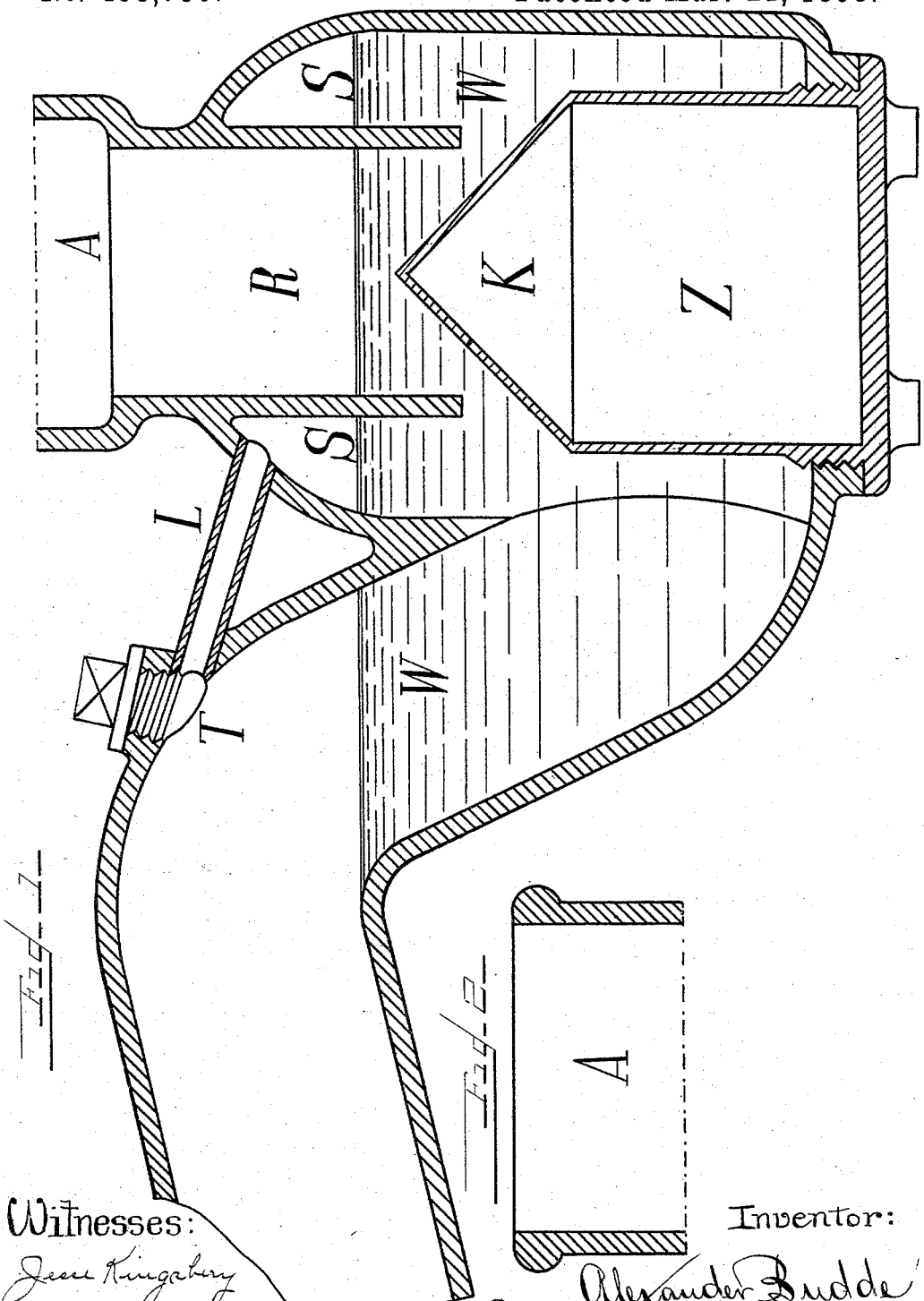

ALEXANDER BUDDE, OF BERLIN, GERMANY.

WATER-TRAP FOR SEWERS.

SPECIFICATION forming part of Letters Patent No. 493,750, dated March 21, 1893.

Application filed May 28, 1892. Serial No. 434,717. (No model.) Patented in Germany August 12, 1891, No. 62,221.

*To all whom it may concern:*

Be it known that I, ALEXANDER BUDDE, manufacturer, of Berlin, in the Kingdom of Prussia and German Empire, have invented a new and useful Improvement in Water-Traps for the Entrance to Drains and Sewers, (for which Letters Patent have been granted to me in Germany, No. 62,221, dated August 12, 1891,) of which the following is a specification, reference being had therein to the accompanying drawings.

This invention relates to water traps for the entrances to drains and sewers and its object is to prevent the exit of air or gas from the sewer without obstructing the passage through the trap.

In the traps generally in use, gases which arise from fermentation of materials in the trap itself have been free to escape and this nuisance has been especially great if any length of time elapse between the operations of flushing the trap. Again, too, owing to an imperfect head of water in the trap the escape of gases from the sewer has not been prevented. With the object of overcoming these defects I construct my improved trap as illustrated by the accompanying drawings, in which Figure 1 is a sectional view of my improved trap. Fig. 2 represents the upper end of the part A of the trap.

The inlet tube A of the trap extends into the main body of the trap far enough to form an annular space or chamber S surrounding said tube between it and the walls of the trap, for the accumulation of gases. The sewer connection is made by a curved discharge pipe T which is connected to the trap near the bottom of the same, below the discharge end of the inlet tube and which curves upward above the plane of the discharge end of said inlet tube. In consequence of this construction the fluid in the trap is maintained at a level higher than the discharge end of the inlet tube thus sealing the latter, and preventing the escape of gases.

Below the inlet tube the bottom of the trap is provided with what I term the displacing cone Z of greater diameter than the inlet tube, having its side walls in line vertically with the annular space or chamber S, and provided with a cone shaped top K which deflects all solid matter falling upon it and prevents it from lodging. Sufficient space is left between the cone and the discharge end of the inlet tube for the passage of solid matter.

In the drawings I have shown the displacing cone removable by means of screw threads engaging a screw threaded aperture in the bottom of the trap, so that it serves also as a plug which may be removed to clean out the trap.

An escape pipe L connects the annular chamber S with the discharge pipe T and it will thus be seen that all gases collecting in said chamber will be allowed to pass through pipe L into the discharge pipe, so that there will never be such an accumulation of gases as to cause a considerable pressure. The displacing cone will deflect all matter out of line with the inlet tube so that the gases which rise in the trap will rise into the annular chamber S instead of rising through the inlet tube.

What I claim, and desire to secure by Letters Patent, is—

1. A trap for sewers having the inlet tube extending into and discharging within the same, and forming an annular chamber surrounding said inlet tube, displacing cone having its side walls in line with said annular chamber and the escape pipe connecting the said annular chamber with sewer, substantially as described.

2. A trap for sewers having the inlet tube extending into and discharging within the same, and forming an annular chamber surrounding said inlet tube, a discharge pipe connected with said trap below the discharge end of said inlet tube, having a portion extending above the discharge end of said inlet tube, and an escape pipe connecting said annular chamber with said discharge pipe, substantially as described.

3. A trap for sewers having the inlet tube extending into and discharging within the same, and forming an annular chamber surrounding said inlet tube, the displacing cone removably secured in said trap having its side walls in line with said annular chamber and an escape pipe for connecting said chamber with the sewer, substantially as described.

4. A trap for sewers having the inlet tube extending into and discharging within the same, and forming an annular chamber surrounding said tube, the displacing cone having its side walls in line with said annular chamber, the discharge pipe connected to said trap below, and having portions extending above, the plane of the discharge end of said inlet tube and the escape pipe connecting the annular chamber with the discharge pipe, substantially as described.

In witness whereof I have hereunto set my hand in presence of two witnesses.

ALEXANDER BUDDE.

Witnesses:
W. H. EDWARDS,
PAUL BRINKMANN,